US012477191B2

(12) United States Patent
Agarwal et al.

(10) Patent No.: US 12,477,191 B2
(45) Date of Patent: Nov. 18, 2025

(54) ELECTRONIC DEVICE AND CONTROL METHOD THEREOF

(71) Applicant: SAMSUNG ELECTRONICS CO., LTD., Suwon-si (KR)

(72) Inventors: Devendra Agarwal, Suwon-si (KR); Ilwoo Park, Suwon-si (KR); Sumyoung Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/239,968

(22) Filed: Aug. 30, 2023

(65) Prior Publication Data

US 2023/0412895 A1 Dec. 21, 2023

Related U.S. Application Data

(63) Continuation of application No. PCT/KR2022/004264, filed on Mar. 25, 2022.

(30) Foreign Application Priority Data

Mar. 26, 2021 (KR) ........................ 10-2021-0039795

(51) Int. Cl.
*H04N 21/81* (2011.01)
*H04N 21/44* (2011.01)

(52) U.S. Cl.
CPC ..... *H04N 21/812* (2013.01); *H04N 21/44008* (2013.01)

(58) Field of Classification Search
CPC ........... H04N 21/812; H04N 21/44008; H04N 21/431; H04N 21/44; H04N 21/454; H04N 21/81; H04N 21/4316; G06N 3/08
(Continued)

(56) References Cited

U.S. PATENT DOCUMENTS 6,373,979 B1 4/2002 Wang
8,111,951 B2 2/2012 Kim
(Continued)

FOREIGN PATENT DOCUMENTS

CN 108985229 A 12/2018
JP 2006-115405 4/2006
(Continued)

OTHER PUBLICATIONS

International Search Report dated Jul. 13, 2022 in International Patent Application No. PCT/KR2022/004264.
(Continued)

*Primary Examiner* — Adil Ocak
(74) *Attorney, Agent, or Firm* — STAAS & HALSEY LLP

(57) ABSTRACT

An electronic device including: a communication interface; a memory to store at least one instruction; and a processor, wherein the processor is configured to receive a first video including a plurality of frames from an external device through the communication interface, acquire reference data corresponding to an advertisement video included in the first video based on a first sequence acquired based on red, green, and blue (RGB) values of the plurality of frames included in the first video, and compare a second sequence corresponding to a second video received from the external device with the reference data to determine whether the second video is the advertisement video.

14 Claims, 9 Drawing Sheets

(58) Field of Classification Search
USPC .......................................................... 725/14
See application file for complete search history.

(56) References Cited

U.S. PATENT DOCUMENTS

| | | |
|---|---|---|
| 9,510,044 B1 | 11/2016 | Pereira et al. |
| 9,886,650 B2 | 2/2018 | Kwak et al. |
| 10,269,121 B2 | 4/2019 | Socek et al. |
| 10,356,487 B2 | 7/2019 | Xiong |
| 10,522,115 B2 | 12/2019 | Hwang et al. |
| 2006/0248569 A1* | 11/2006 | Lienhart ............... H04N 5/76 725/135 |
| 2007/0124756 A1 | 5/2007 | Covell et al. |
| 2008/0313667 A1 | 12/2008 | Ohtsuki |
| 2016/0381320 A1* | 12/2016 | Mate ..................... G11B 27/28 348/441 |
| 2018/0357489 A1 | 12/2018 | Mitra et al. |

FOREIGN PATENT DOCUMENTS

| | | |
|---|---|---|
| JP | 2008-311692 | 12/2008 |
| JP | 2013-172355 | 9/2013 |
| JP | 2020-141273 | 9/2020 |
| JP | 2020-198606 | 12/2020 |
| KR | 2000-0076565 | 12/2000 |
| KR | 10-2010-0037582 | 4/2010 |
| KR | 10-2016-0103123 | 8/2016 |
| KR | 10-2016-0109221 | 9/2016 |
| KR | 10-2021-0126618 | 11/2016 |
| KR | 10-2016-0138364 | 12/2016 |
| KR | 10-2017-0054900 | 5/2017 |
| KR | 10-2076275 | 2/2020 |

OTHER PUBLICATIONS

PCT/ISA/237 dated Jul. 13, 2022 in International Patent Application No. PCT/KR2022/004264.
Korean Office Action issued Oct. 1, 2025 for Application No. 10-2021-0039795.

* cited by examiner

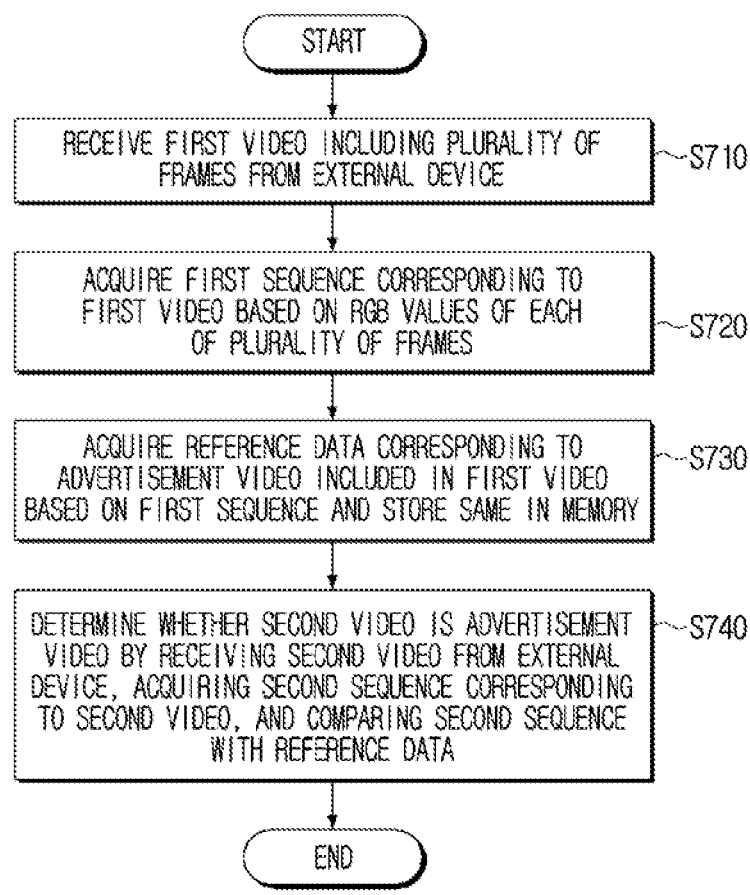

ELECTRONIC DEVICE AND CONTROL METHOD THEREOF

CROSS-REFERENCE TO RELATED APPLICATION(S)

This application is a continuation application, under 35 U.S.C. § 111(a), of international application No. PCT/KR2022/004264, filed on Mar. 25, 2022, which claims priority under 35 U. S. C. § 119 to Korean Patent Application No. 10-2021-0039795, filed on Mar. 26, 2021, the disclosures of which are incorporated herein by reference in their entireties.

BACKGROUND

Field

The disclosure relates to an electronic device and a control method thereof, and more particularly, to an electronic device which may determine whether a video being streamed is an advertisement, and a control method thereof.

Description of the Related Art

An artificial intelligence system may be a computer system which implements human-level intelligence, and in which a machine learns and determines itself, and has an improved recognition rate as the system is used.

Artificial intelligence technology may include machine learning (or deep learning) technology using an algorithm that classifies/learns characteristics of input data by itself, and elemental technology to mimic functions such as the recognition and determination of a human brain by using machine learning algorithms.

The element technology may include, for example, at least one of linguistic understanding technology to recognize human language/characters, visual comprehension technology to recognize an object like human eyes, inference/prediction technology to logically infer and predict data by determining the data, knowledge expression technology to process human experience data into knowledge data, or motion control technology to control autonomous driving of a vehicle and movement of a robot.

Today, a user watches a video by using various electronic devices such as a television (TV), a smartphone, a tablet personal computer (PC), and a PC. However, an advertisement video that the user does not intend to watch may be often displayed while the video the user is watching is being displayed on the electronic device. In case that the video the user is watching is a video on demand (VOD), the user may continuously watch the video the user watched before without watching the advertisement video by selecting an object for skipping the advertisement. However, the object for skipping an advertisement is not provided in case that the user is live-streaming the video. Accordingly, the user may have inconvenience of having to watch the advertisement video until the video the user watched before is played again.

In order to solve this problem, a method of detecting the advertisement video has been devised using a set of various parameters for the advertisement video, that is, data referred to as a video signature. However, an operation of generating the video signature for a video streamed live in real time may require a large amount of computation. Accordingly, there is a limit in that the method using the video signature is difficult to be applied to a TV having a relatively limited memory capacity.

Accordingly, there is an arising need for technology to provide data on the advertisement video (e.g., time when the advertisement video ends) even with a relatively small amount of computation in case that the advertisement video is streamed live.

SUMMARY

According to one or more embodiments of the disclosure, an electronic device includes: a communication interface; a memory to store at least one instruction; and a processor configured to receive a first video including a plurality of frames from an external device through the communication interface, acquire reference data corresponding to an advertisement video included in the first video based on a first sequence that is acquired based on red, green, and blue (RGB) values of each of the plurality of frames included in the first video, and compare a second sequence corresponding to a second video received from the external device with the reference data to determine whether the second video is the advertisement video.

The processor may be configured to acquire the plurality of first numbers based on an average value of the RGB values of a predetermined region of each of the plurality of frames corresponding to the plurality of first numbers included in the first sequence.

The processor may be configured to analyze the first sequence to identify a sequence repeated equal to or greater than a predetermined number of times, and acquire the identified sequence that is repeated as the reference data.

The processor may be configured to acquire data on a sequence corresponding to the advertisement video among first sequences by inputting the first sequence to a neural network model trained to identify the advertisement video. The processor may be configured to acquire the reference data based on the data on the sequence corresponding to the advertisement video. Here, the data on the sequence corresponding to the advertisement video may include at least the sequence corresponding to the advertisement video, a number corresponding to a start frame of the advertisement video, and a number corresponding to a last frame of the advertisement video.

The processor may be configured to acquire similarity between a sequence included in the second sequence and a sequence included in the reference data. The processor may be configured to determine that the second video is the advertisement video based on similarity is greater than a predetermined value.

The electronic device may further include a display. The processor may be configured to control the display to overlay and display data on the second video on a screen on which the second video is displayed while displaying the second video in case of determining that the second video is the advertisement video.

The data on the second video may include an end time of the second video.

According to other embodiments of the disclosure, a control method of an electronic device includes: receiving a first video including a plurality of frames from an external device; acquiring a first sequence corresponding to the first video based on an red, green, and blue (RGB) values of each of the plurality of frames included in the first video; acquiring reference data corresponding to an advertisement video included in the first video based on the first sequence and storing the reference data in a memory; and determining whether a second video is the advertisement video by receiving the second video from the external device, acquiring a second sequence corresponding to the second video, and comparing the second sequence with the reference data.

The first sequence may include a plurality of first numbers respectively corresponding to the plurality of frames. In the acquiring of the first sequence, the plurality of first numbers may be acquired based on an average value of the RGB values of a predetermined region of the plurality of frames.

In the acquiring of the reference data, the first sequence may be analyzed to identify a sequence that is repeated a predetermined number of times or more, and the identified sequence that is repeated may be acquired as the reference data.

The acquiring of the reference data may includes: acquiring data on a sequence corresponding to the advertisement video among the first sequences by inputting the first sequence to a neural network model trained to identify the advertisement video; and acquiring the reference data based on the data on the sequence corresponding to the advertisement video.

In the determining of whether the second video is the advertisement video, similarity between a sequence included in the second sequence and a sequence included in the reference data may be acquired, and the second video may be determined as the advertisement video based on similarity is greater than a predetermined value.

The control method may further include overlaying and displaying data on the second video on a screen on which the second video is displayed while the second video is displayed in case that it is determined that the second video is the advertisement video.

Technical solutions suggested by the disclosure are not limited to the above-mentioned solutions, and solutions that are not mentioned will be clearly understood by those skilled in the art to which the disclosure pertains from the specification and the accompanying drawings.

BRIEF DESCRIPTION OF THE DRAWINGS

The above and/or other aspects of the disclosure will be more apparent by describing certain embodiments of the disclosure with reference to the accompanying drawings, in which:

FIG. 7 is a flowchart showing a control method of an electronic device according to other embodiments of the disclosure.

DETAILED DESCRIPTION

Figure 1:
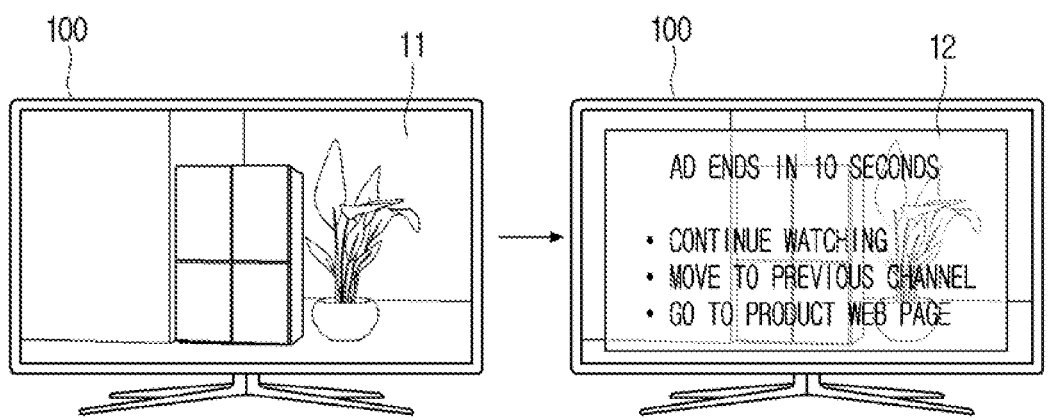
FIG. 1 is a view for explaining an operation of an electronic device according to one or more embodiments of the disclosure.

Terms used in the specification are briefly described, and the disclosure is then described in detail.

General terms that are currently widely used were selected as terms used in embodiments of the disclosure in consideration of functions in the disclosure, and may be changed based on the intention of those skilled in the art or a judicial precedent, the emergence of a new technique, and the like. In addition, in a specific case, terms arbitrarily chosen by an applicant may exist. In this case, the meanings of such terms are mentioned in detail in corresponding descriptions of the disclosure. Therefore, the terms used in the embodiments of the disclosure need to be defined on the basis of the meanings of the terms and the contents throughout the disclosure rather than simple names of the terms.

The disclosure may be variously modified and have several embodiments, and specific embodiments of the disclosure are thus illustrated in the drawings and described in detail in the detailed description. However, it is to be understood that the disclosure is not limited to the specific embodiments, and includes all modifications, equivalents, and substitutions without departing from the scope and spirit of the disclosure. In case that it is decided that the detailed description of the known art related to the disclosure may obscure the gist of the disclosure, a detailed description therefor will be omitted.

Terms "first," "second," and the like, may be used to describe various components. However, the components are not to be construed as being limited by these terms. The terms are used only to distinguish one component from another component.

A term of a singular number may include its plural number unless explicitly indicated otherwise in the context. It is to be understood that a term "include," "formed of" or the like used in this application specifies the presence of features, numerals, steps, operations, components, parts or combinations thereof, which is mentioned in the specification, and does not preclude the presence or addition of one or more other features, numerals, steps, operations, components, parts or combinations thereof.

Hereinafter, embodiments of the disclosure will be described in detail with reference to the accompanying drawings so that those skilled in the art to which the disclosure pertains may easily practice the disclosure. However, the disclosure may be modified in various different forms, and is not limited to the embodiments provided in the specification. In addition, in the drawings, portions unrelated to the description are omitted to clearly describe the disclosure, and similar portions are denoted by similar reference numerals throughout the specification.

The disclosure provides technology to determine whether a video received from an external device is an advertisement video.

The disclosure also provides technology to acquire and provide data on an advertisement video in case that a video received from an external device is the advertisement video.

Objects of the disclosure are not limited to the above-mentioned objects. That is, other objects that are not mentioned may be obviously understood by those skilled in the art from the following description.

According to various embodiments of the disclosure as described above, the electronic device may determine whether the video received from the external device is the advertisement video. In addition, in case that the video received from the external device is the advertisement video, the electronic device may acquire and provide the data on the advertisement video. It is thus possible to improve user convenience and satisfaction.

Another effect which may be acquired or predicted by the embodiments of the disclosure is disclosed directly or implicitly in the detailed description of the embodiments of the disclosure. For example, various effects predicted according to the embodiments of the disclosure are disclosed in the detailed description described below.

FIG. 1 is a view for explaining an operation of an electronic device according to one or more embodiments of the disclosure. An electronic device 100 may display a video 11 streamed live on a first channel (e.g., BBC). While displaying the video 11, the electronic device 100 may determine whether the video 11 is an advertisement video. For example, the electronic device 100 may acquire a sequence corresponding to video 11. In addition, the electronic device 100 may determine whether the video 11 is the advertisement video by comparing the sequence corresponding to the video 11 with reference data stored in the electronic device 100. A detailed description of a method of determining whether the video 11 is the advertisement video is provided below with reference to FIGS. 3 to 5.

In case of determining that the video 11 is the advertisement video, the electronic device 100 may provide data 12 on the video 11 while displaying the video 11. For example, the data on the video 11 may include data on an end time of the video 11 and data on a web page of a product corresponding to the video 11. Here, the electronic device 100 may overlay the data 12 on the video 11 on a screen on which the video 11 is displayed. In addition, the electronic device 100 may reduce the brightness or volume of the video 11.

A user may operate the electronic device 100 based on the data 12 on the video 11. For example, the user may change the first channel to another channel to watch a video of another channel, and then select the first channel again based on the end time of the video 11. Alternatively, the user may purchase the product or acquire data on the product by selecting the web page of the product corresponding to the video 11. Accordingly, the user's convenience and satisfaction may be improved. It is thus possible to improve user convenience and satisfaction.

Figure 2:
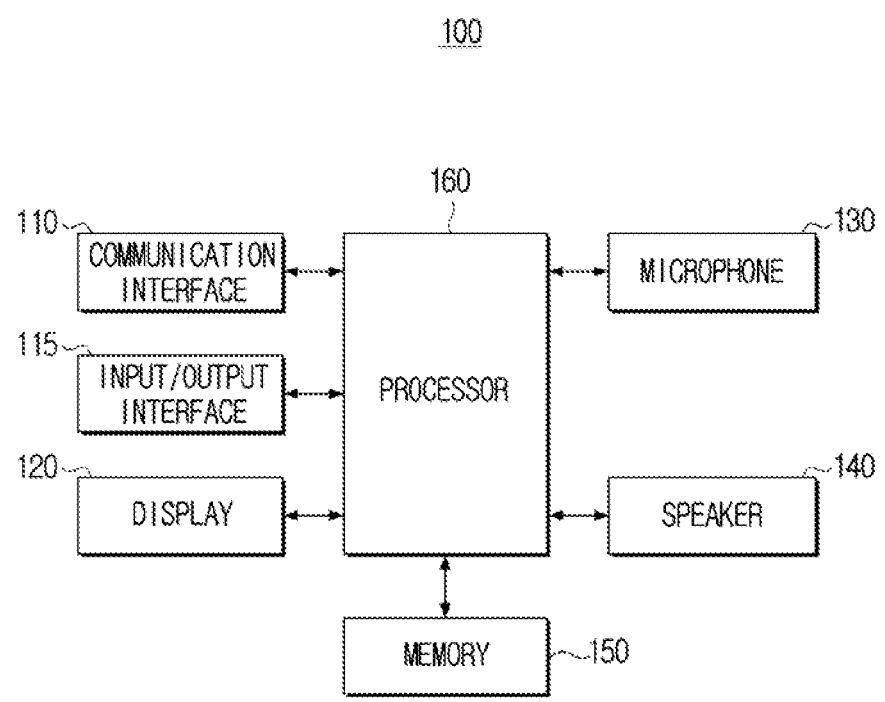
FIG. 2 is a block diagram showing a configuration of the electronic device according to one or more embodiments of the disclosure.

FIG. 2 is a block diagram showing a configuration of the electronic device according to one or more embodiments of the disclosure. The electronic device 100 may include a communication interface 110, an input/output interface 115, a display 120, a microphone 130, a speaker 140, a memory 150, and a processor 160. For example, the electronic device 100 may be a display device such as a TV. However, such a device is only an example, and the electronic device 100 may be a set-top box.

The communication interface 110 may include at least one circuit and communicate with an external device or an external server. For example, the communication interface 110 may receive a command for controlling the electronic device 100 from a remote control device or a user terminal. In addition, the communication interface 110 may receive a video (or video data) from the external device (e.g., a set-top box) or the external server (e.g., a broadcasting station server).

The communication interface 110 may perform communication in various communication methods. For example, the communication interface 110 may receive a control command or a user voice from the user terminal in a wireless communication method. In addition, the communication interface 110 may receive a broadcast content from the external broadcasting station in a wired communication method.

The communication interface 110 may include a wireless communication module and a wired communication module. The wireless communication module may include at least one of a Bluetooth low energy (BLE) module, a wireless-fidelity (Wi-Fi) communication module, a cellular communication module, a 3rd generation (3G) mobile communication module, a 4th generation (4G) mobile communication module, 4th generation long term evolution (LTE) communication module, or a 5th generation (5G) mobile communication module. The wired communication module may include an Ethernet module.

The input/output interface 115 may perform communication with the external device. The input/output interface 115 may receive a video from the external device (e.g., set-top box or digital video development platform (DVDP)). Alternatively, in case that the electronic device 100 is implemented as the set-top box, the electronic device 100 may transmit a video to an external display device through the input/output interface 115.

The input/output interface 115 may include at least one communication terminal. For example, the input/output interface 115 may include at least one of a high definition multimedia interface (HDMI) port, a display port (DP) port, a red-green-blue (RGB) port, a digital visual interface (DVI) port, a thunderbolt port, a universal serial bus (USB) port, a video graphics array (VGA), a D-subminiature (D-SUB) port, a local area network (LAN) port, or a wide area network (WAN) port. In some embodiments, the input/output interface 115 may include a port for inputting and outputting only an audio signal and a port for inputting and outputting only a video signal as its separate ports, or may be implemented as a single port for inputting and outputting both the audio signal and the video signal.

The electronic device 100 according to the disclosure may receive the video from the external device or the external server through the communication interface 110 or the input/output interface 115.

The display 120 may output the video under control of the processor 160. In addition, the display 120 may output data on the video along with the video. For example, in case that the video is the advertisement video, the display 120 may overlay data on an end time of the advertisement video while outputting the advertisement video. In addition, the display 120 may output the web page of the product corresponding to the advertisement video. Meanwhile, the display 120 may be implemented as liquid crystal display panel (LCD), organic light emitting diodes (OLED), or the like, and the display 120 may also be implemented as a flexible display, a transparent display, or the like. However, the display 120 according to the disclosure is not limited to a specific type.

Meanwhile, the video according to the disclosure may be output not only by the display 120 but also by the external display device. For example, in case that the electronic device 100 is the set-top box, the video may be transmitted to the external display device through the communication interface 110 and output by the external display device.

The microphone 130 may acquire the user voice. The processor 160 may acquire the user voice through the microphone 130 and control the electronic device 100 based on the user voice. For example, in case of acquiring a voice command corresponding to the advertisement video displayed through the display 120, the processor 160 may control the display 120 to display the web page of the product corresponding to the advertisement video.

Meanwhile, the processor 160 may receive the user voice from the external device. For example, the processor 160 may receive the user voice acquired through the microphone included in the external device from the remote control device. Here, the external device may include the user terminal and the remote control device. Here, the received user voice may be a signal digitized by the external device.

The speaker 140 may output voice data. For example, the speaker 140 may output the voice data corresponding to the video data output through the display 120. In addition, the speaker 140 may output a guide message for interaction with the user.

The memory 150 may store an operating system (OS) for controlling overall operations of components of the electronic device 100, and instructions or data on the components of the electronic device 100. For example, the memory 150 may store the sequence corresponding to the video output through the display 120. In addition, the memory 150 may store the reference data on detecting the advertisement video. The reference data may include data on a sequence corresponding to the advertisement video. For example, the data on the sequence corresponding to the advertisement video may include the sequence corresponding to the advertisement video, a number corresponding to a start frame of the advertisement video, and a number corresponding to the last frame of the advertisement video.

The memory 150 may store a neural network model trained to identify the advertisement video. The neural network model may be trained to identify the sequence corresponding to the advertisement video among sequences corresponding to a first video, based on the sequence corresponding to the first video received from the external device. That is, the neural network model may be trained to infer and predict a sequence corresponding to an input video. The inference/prediction is technology to logically infer and predict data by determining the data, and may include knowledge/probability-based inference, optimization prediction, preference-based planning, recommendation, and the like. Meanwhile, the memory 150 may be implemented as a non-volatile memory (e.g., hard disk, solid state drive (SSD), or flash memory), a volatile memory, or the like.

Meanwhile, the electronic device 100 may be operated based on a user voice command. To this end, the memory 150 may store a natural language processing module. The natural language processing module may include a speech recognition module, a natural language understanding module, a dialog management module, a natural language generation module, or a speech synthesis module.

The processor 160 may be electrically connected to the memory 150 and control the overall operation and function of the electronic device 100. For example, the processor 160 may receive the first video including a plurality of frames from the external device through the communication interface. In addition, the processor 160 may acquire a first sequence corresponding to the first video based on red, green, and blue (RGB) values of each of the plurality of frames. The first sequence may include a plurality of first numbers corresponding to each of the plurality of frames. The processor 160 may acquire the plurality of first numbers based on an average value of the RGB values of a predetermined region of each of the plurality of frames.

The processor 160 may acquire the reference data in various ways. For example, the processor 160 may analyze the first sequence to identify a sequence repeated a predetermined number of times or more, and acquire the identified sequence as the reference data. For another example, the processor 160 may acquire the data on the sequence corresponding to the advertisement video among the first sequences by inputting the first sequence to the neural network model trained to identify the advertisement video. In addition, the processor 160 may acquire the reference data based on the data on the sequence.

The processor 160 may determine whether a received video is the advertisement video based on the reference data. For example, the processor 160 may receive a second video from the external device. In addition, the processor 160 may acquire a second sequence corresponding to the second video. The processor 160 may acquire similarity between a sequence included in the second sequence and a sequence included in the reference data. The processor 160 may determine that the second video is the advertisement video in case that the similarity is greater than a predetermined value.

Meanwhile, the processor 160 may calculate the similarity by comparing some of the numbers included in the second sequence with the reference data. For example, in case that the second sequence includes 1000 numbers, the processor 160 may calculate the similarity by comparing the sequences from the first to fifth numbers with the reference data. Here, the processor 160 may determine that the second video is the advertisement video in case that the similarity is greater than the predetermined value. In this way, the processor 160 may determine whether the second video is the advertisement video without comparing the entire second sequence with the reference data. Accordingly, the processor 160 may quickly determine whether the video received in real time from the external device and output by the display 120 is the advertisement video.

The processor 160 may control the display 120 to overlay and display the data on the second video on a screen on which the second video is displayed while displaying the second video in case of determining that the second video is the advertisement video. Here, the data on the second video may include a message including an end time of the second video.

Meanwhile, for convenience of explanation, in the disclosure, the first video refers to a video received in a step of acquiring the reference data, and the second video refers to a video received in a step of determining the advertisement video. However, an operation of the processor 160 acquiring the reference data may be performed simultaneously with an operation of determining the advertisement video. In this case, the first video and the second video may be the same video.

Meanwhile, functions related to an artificial intelligence according to the disclosure may be operated through the processor 160 and the memory 150. The processor 160 may be at least one processor. In this case, at least one processor may be a general-purpose processor such as a graphic processing unit (CPU), an application processor (AP) or a digital signal processor (DSP), a graphics-only processor such as a graphic processing unit (GPU) or a vision processing unit (VPU), or an artificial intelligence-only processor such as a neural processing unit (NPU). At least one processor may control the input data to be processed based on a predefined operation rule or an artificial intelligence model stored in the memory 150. Alternatively, in case that at least one processor is the artificial intelligence-only processor, the artificial intelligence-only processor may be designed to have a hardware structure specialized for processing a specific artificial intelligence model.

The predefined operation rule or the artificial intelligence model may be generated by learning. Here, to be generated by the learning may indicate that a basic artificial intelligence model is trained using a number of learning data, based on a learning algorithm, thereby generating the predefined operation rule or the artificial intelligence model, set to perform a desired feature (or purpose). Such learning may be performed on a device itself on which the artificial intelligence is performed according to the disclosure, or by a separate server and/or system. An example of the learning algorithm may include, supervised learning, unsupervised learning, semi-supervised learning, or reinforcement learning, and may not be limited thereto.

The artificial intelligence model may be generated through learning. Here, to be generated by the learning may indicate that the basic artificial intelligence model is trained using a number of learning data, based on the learning algorithm, thereby generating the predefined operation rule or the artificial intelligence model, set to perform the desired feature (or purpose). The artificial intelligence model may include a plurality of neural network layers. The plurality of neural network layers may each have a plurality of weight values, and perform a neural network computation by computation of a previous-layer computation result and the plurality of weight values. The plurality of weight values of the plurality of neural network layers may be optimized by a trained result of the artificial intelligence model. For example, the plurality of weight values may be updated during a learning process to reduce or minimize a loss value or a cost value, acquired from the artificial intelligence model.

The artificial intelligence model may be processed by the artificial intelligence-only processor designed to have the hardware structure specialized for processing the artificial intelligence model. The artificial intelligence model may be generated through the learning. Here, to be generated by the learning may indicate that the basic artificial intelligence model is trained using a number of learning data, based on the learning algorithm, thereby generating the predefined operation rule or the artificial intelligence model, set to perform the desired feature (or purpose). The artificial intelligence model may include the plurality of neural network layers. The plurality of neural network layers may each have the plurality of weight values, and perform the neural network computation by the computation of the previous-layer computation result and the plurality of weight values.

The artificial neural network may include a deep neural network (DNN), and include, for example, convolutional neural network (CNN), the deep neural network (DNN), the recurrent neural network (RNN), a generative adversarial network (GAN), a restricted Boltzmann machine (RBM), a deep belief network (DBN), a bidirectional recurrent deep neural network (BRDNN), a deep q-network, or the like, and is not limited thereto.

Figure 3:
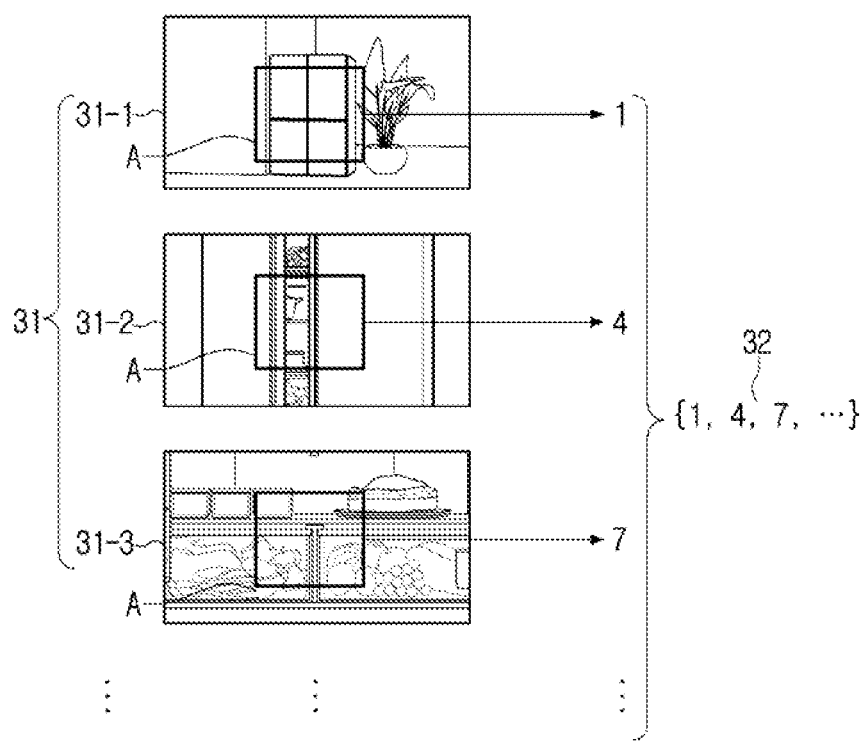
FIG. 3 is a view for explaining a method of acquiring a sequence according to one or more embodiments of the disclosure.

FIG. 3 is a view for explaining a method of acquiring a sequence according to one or more embodiments of the disclosure. The electronic device 100 may receive and display a first video 31 from the external device. For example, the first video 31 may be a video streamed live.

The electronic device 100 may acquire a first sequence 32 corresponding to the first video 31. The electronic device 100 may acquire a number corresponding to a frame based on RGB values of a predetermined region of the frame included in the first video 31. For example, the electronic device 100 may acquire a first number (that is, 1) based on an average value of RGB values of a predetermined region A of a first frame 31-1. The electronic device 100 may acquire a second number (that is, 4) based on an average value of RGB values of a predetermined region A of a first frame 31-2. The electronic device 100 may acquire a third number (that is, 7) based on an average value of RGB values of a predetermined region A of a third frame 31-3. In this way, the electronic device 100 may acquire the first sequence 32 including the number corresponding to each frame included in the first video 31.

Figure 4A:
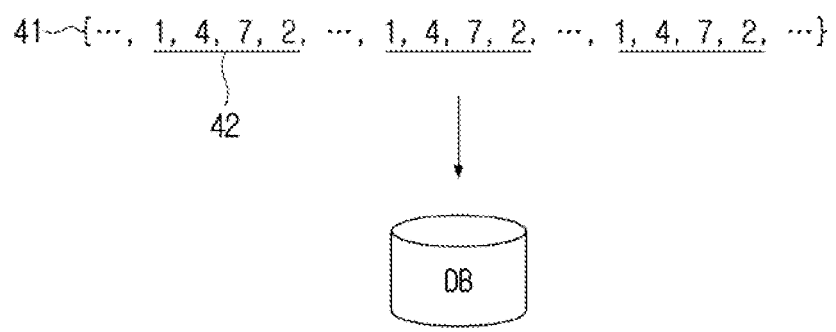
FIG. 4A is a view for explaining a method of acquiring reference data according to one or more embodiments of the disclosure.

FIG. 4A is a view for explaining a method of acquiring the reference data according to one or more embodiments of the disclosure. The electronic device 100 may acquire a first sequence 41 corresponding to the first video received from the external device and store the same in a database DB. Here, the database DB may be stored in the memory 150 of the electronic device 100 or the external server.

The electronic device 100 may acquire the reference data by analyzing the first sequence 41 stored in the database DB. For example, the electronic device 100 may identify a first sequence 42 repeated a predetermined number of times or more in the first sequence 41. In addition, the electronic device 100 may acquire the first sequence 42 as the reference data. The electronic device 100 may store the acquired reference data in the memory 150 and delete the remaining sequences included in the first sequence 41 from the database DB.

Figure 4B:
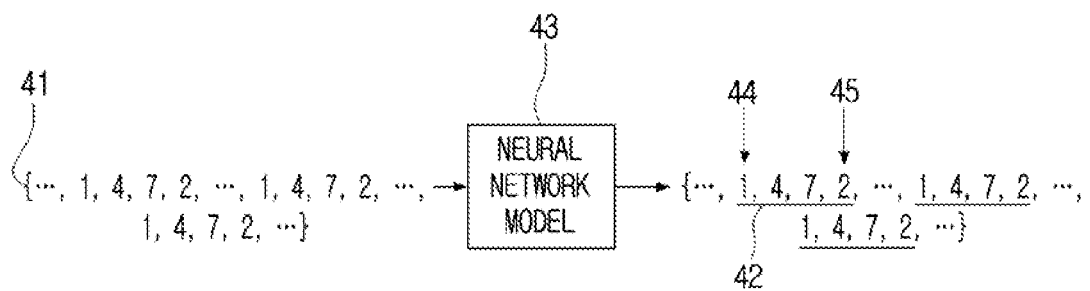
FIG. 4B is a view for explaining a method for acquiring reference data according to other embodiments of the disclosure.

FIG. 4B is a view for explaining a method for acquiring the reference data according to other embodiments of the disclosure. The electronic device 100 may acquire data on the first sequence 42 corresponding to the advertisement video by inputting the first sequence 41 to a neural network model 43 trained to identify the advertisement video. For example, the data on the first sequence 42 may include a number 44 corresponding to the start frame of the advertisement video and a number 45 corresponding to the last frame of the advertisement video. Alternatively, the data on the first sequence 42 may include a frame number corresponding to the first number of the first sequence 42 and a frame number corresponding to the last number of the first sequence 42.

Figure 4C:
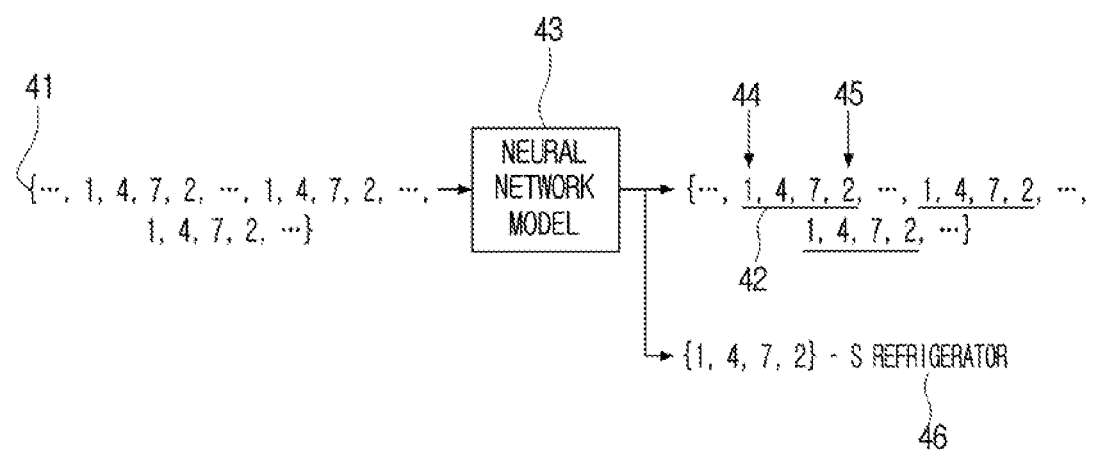
FIG. 4C is a view for explaining a method of acquiring reference data according to still other embodiments of the disclosure.

Meanwhile, the neural network model 43 may be trained to output identification data of the advertisement video corresponding to the first sequence 42. In this case, the electronic device 100 may acquire the data on the advertisement video based on the acquired identification data. As shown in FIG. 4C, the electronic device 100 may acquire identification data 46 of the advertisement video corresponding to the first sequence 42 by inputting the first sequence 41 to the neural network model 43. Accordingly, the electronic device 100 may provide the data on the advertisement video based on the identification data 46. For example, the electronic device 100 may display a web page screen of the product corresponding to the advertisement video.

Figure 5:
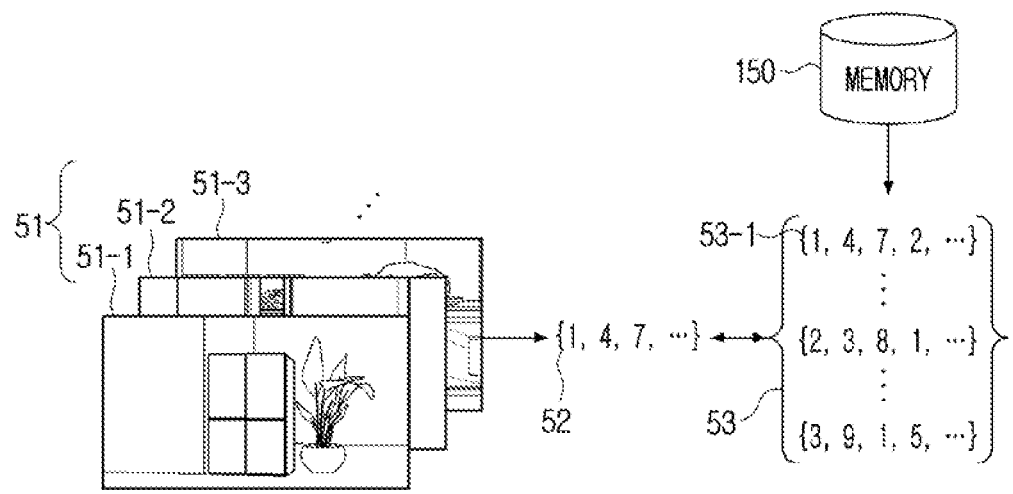
FIG. 5 is a view for explaining a method of determining an advertisement according to one or more embodiments of the disclosure.

FIG. 5 is a view for explaining a method of determining the advertisement according to one or more embodiments of the disclosure. The electronic device 100 may receive a second video 51 including a plurality of frames 51-1, 51-2, and 51-3 from the external device. In addition, the electronic device 100 may acquire a second sequence 52 corresponding to the second video 51. The electronic device 100 may determine whether the second video 51 is the advertisement video based on the second sequence 52 and reference data 53 stored in the memory 150. Here, the reference data 53 may include various sequences corresponding to the advertisement video. For example, the reference data 53 may include a first sequence 53-1 corresponding to an advertisement video of 'S Refrigerator'.

The electronic device 100 may acquire each similarity between a plurality of sequences included in the second sequence 52 and the reference data 53. In addition, the electronic device 100 may determine whether a sequence whose similarity with the second sequence 52 is greater than a predetermined value exists among the plurality of sequences. In case that a sequence whose similarity with the second sequence 52 is greater than the predetermined value exists, the electronic device 100 may determine that the second video 51 is the advertisement video. For example, the reference data may include the first sequence 53-1 whose similarity with the second sequence 52 is greater than the predetermined value. Here, the electronic device 100 may determine that the second video 51 is the advertisement video corresponding to the first sequence 53-1.

Figure 6:
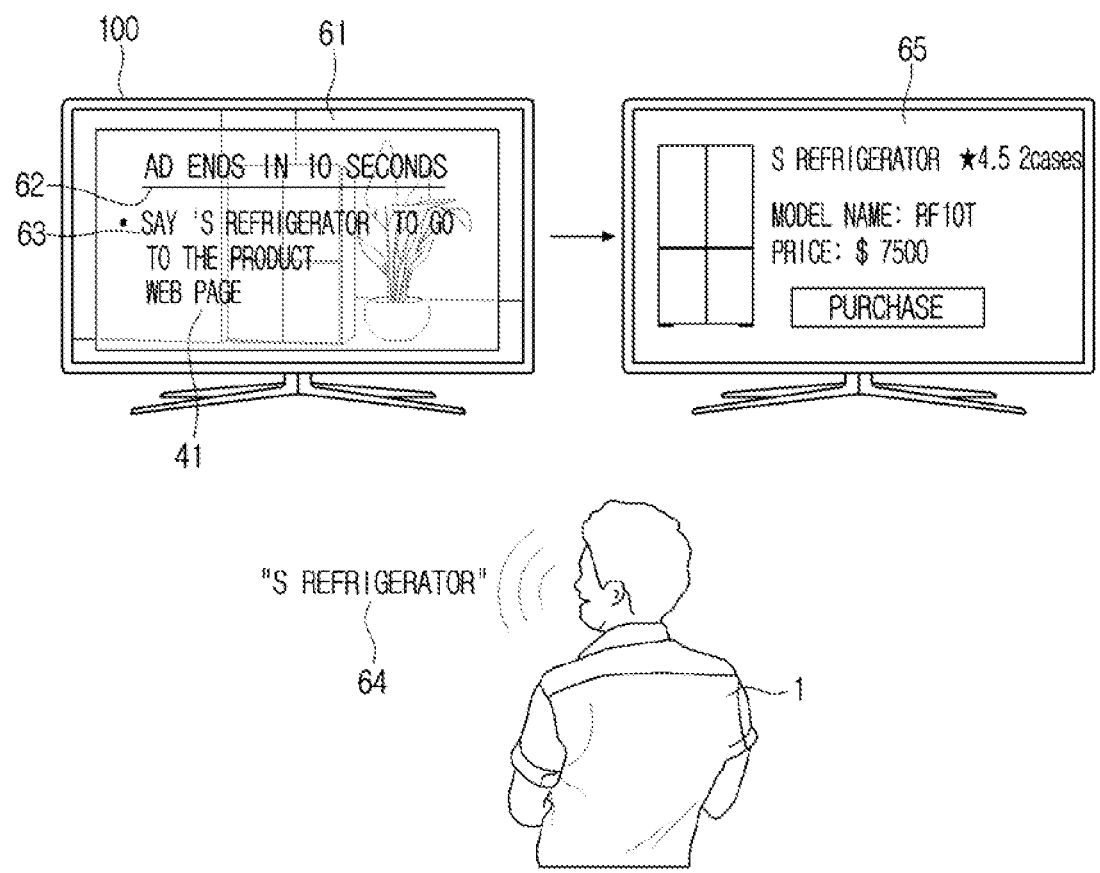
FIG. 6 is a view for explaining a method of providing data on an advertisement video according to one or more embodiments of the disclosure.

FIG. 6 is a view for explaining a method of providing the data on the advertisement video according to one or more embodiments of the disclosure. The electronic device 100 may receive and display a video 61 from the external device. In case of determining that the video 61 is the advertisement video, the electronic device 100 may display data on the video 61. The electronic device 100 may overlay and display the data on the video 61 on the video 61. The data on the video 61 may include data 62 on an end time of the video 61 and a message 63 for guiding additional data on the video 61.

The electronic device 100 may acquire the user voice while displaying the video 61 and the data on the video 61. The electronic device 100 may acquire the user voice through the microphone 130 or the external device (e.g., smart speaker, remote control device, or user terminal). For example, an application installed in the user terminal may be executed and the user terminal may thus acquire the user voice, and the electronic device 100 may receive the user voice from the user terminal.

The electronic device 100 may be operated based on the user voice. For example, in case of acquiring a voice command 64 requesting the additional data on the video 61, the electronic device 100 may stop displaying the video 61 and the data on the video 61, and display a screen including the additional data on the video 61. The electronic device 100 may display a web page screen 65 of a product corresponding to the video 61.

FIG. 7 is a flowchart showing a control method of an electronic device according to other embodiments of the disclosure. An electronic device 100 may receive a first video including a plurality of frames from an external device (S710). The electronic device 100 may acquire a first sequence corresponding to the first video based on red, green, and blue (RGB) values of each of the plurality of frames (S720). Here, the electronic device 100 may acquire a plurality of first numbers respectively corresponding to the plurality of frames based on an average value of the RGB values of a predetermined region of each of the plurality of frames.

The electronic device 100 may acquire reference data corresponding to an advertisement video included in the first video based on the first sequence and store the same in a memory (S730). For example, the electronic device 100 may analyze the first sequence to identify a sequence repeated a predetermined number of times or more, and acquire the identified sequence as the reference data. Alternatively, the electronic device 100 may acquire data on a sequence corresponding to the advertisement video among the first sequences by inputting the first sequence to a neural network model trained to identify the advertisement video. In addition, the electronic device 100 may acquire the reference data based on the data on the sequence corresponding to the advertisement video. Here, the data on the sequence corresponding to the advertisement video may include the sequence corresponding to the advertisement video, a number corresponding to a start frame of the advertisement video, and a number corresponding to the last frame of the advertisement video.

The electronic device 100 may determine whether a second video is the advertisement video by receiving the second video from the external device, acquiring a second sequence corresponding to the second video, and comparing the second sequence with the reference data (S740). The electronic device 100 may overlay and display data on the second video on a screen on which the second video is displayed while displaying the second video in case of determining that the second video is the advertisement video. Here, the data on the second video may include an end time of the second video.

Meanwhile, the various embodiments of the disclosure described above may be implemented in a computer or a computer-readable recording medium using software, hardware, or a combination of software and hardware. In some cases, the embodiments described in the disclosure may be implemented by the processor itself. According to a software implementation, the embodiments such as procedures and functions described in the disclosure may be implemented by separate software modules. Each of the software modules may perform one or more functions and operations described in the disclosure.

Meanwhile, computer instructions for performing processing operations according to the various embodiments of the disclosure described above may be stored in a non-transitory computer-readable medium. The computer instructions stored in the non-transitory computer-readable medium allow a specific machine to perform the processing operations according to the various embodiments described above in case that the instructions are executed by a processor thereof.

The non-transitory computer-readable medium is not a medium that stores data therein for a while, such as a register, a cache, or a memory, and indicates a medium that semi-permanently stores data therein and is readable by the machine. A specific example of the non-transitory computer-readable medium may include a compact disk (CD), a digital versatile disk (DVD), a hard disk, a Blu-ray disk, a universal serial bus (USB), a memory card, a read-only memory (ROM), or the like.

Although the embodiments of the disclosure have been shown and described hereinabove, the disclosure is not limited to the above-mentioned specific embodiments, but may be variously modified by those skilled in the art to which the disclosure pertains without departing from the gist of the disclosure as disclosed in the accompanying claims. These modifications should also be understood to fall within the scope and spirit of the disclosure.

What is claimed is:

1. An electronic device comprising:
a communication interface;
a memory to store at least one instruction; and
a processor configured to:
  receive a first video including a plurality of frames from an external device through the communication interface, obtain a first sequence based on red, green, and blue (RGB) values of the plurality of frames included in the first video, obtain data on a sequence corresponding to an advertisement video among the first sequence by inputting the first sequence to an artificial intelligence model trained to identify the advertisement video, obtain reference data based on the data on the sequence corresponding to the advertisement video, and compare a second sequence corresponding to a second video received from the external device with the reference data, and determine whether the second video is the advertisement video.

2. The electronic device as claimed in claim 1, wherein the first sequence includes a plurality of first numbers respectively corresponding to the plurality of frames, and the processor is configured to obtain the plurality of first numbers based on an average value of the RGB values of a predetermined region of the plurality of frames.

3. The electronic device as claimed in claim 1, wherein the processor is configured to:

analyze the first sequence to identify a sequence that is repeated equal to or greater than a predetermined number of times, and obtain the identified sequence that is repeated as the reference data.

4. The electronic device as claimed in claim 1, wherein the data on the sequence corresponding to the advertisement video includes at least the sequence corresponding to the advertisement video, a number corresponding to a start frame of the advertisement video, and a number corresponding to a last frame of the advertisement video.

5. The electronic device as claimed in claim 1, wherein the processor is configured to determine that the second video is the advertisement video based on similarity between a sequence included in the second sequence and a sequence included in the reference data being greater than a predetermined value.

6. The electronic device as claimed in claim 1, further comprising a display, wherein the processor is configured to control the display to overlay and display data on the second video on a screen on which the second video is displayed while displaying the second video based on the second video being determined as the advertisement video.

7. The electronic device as claimed in claim 6, wherein the data on the second video includes an end time of the second video.

8. A control method of an electronic device, comprising:

receiving a first video including a plurality of frames from an external device;

obtaining a first sequence based on red, green, and blue (RGB) values of the plurality of frames included in the first video, obtaining data on a sequence corresponding to an advertisement video among the first sequence by inputting the first sequence to an artificial intelligence model trained to identify the advertisement video, obtaining reference data based on the data on the sequence corresponding to the advertisement video; and determining whether a second video is the advertisement video by comparing a second sequence corresponding to the second video received from the external device with the reference data.

9. The control method as claimed in claim 8, wherein the first sequence includes a plurality of first numbers respectively corresponding to the plurality of frames, and in the obtaining of the first sequence, the plurality of first numbers are obtained based on an average value of the RGB values of a predetermined region of the plurality of frames.

10. The control method as claimed in claim 8, wherein in the obtaining of the reference data, the first sequence is analyzed to identify a sequence that is repeated equal to or greater than a predetermined number of times, and the identified sequence that is repeated is obtained as the reference data.

11. The control method as claimed in claim 8, wherein the data on the sequence corresponding to the advertisement video includes at least the sequence corresponding to the advertisement video, a number corresponding to a start frame of the advertisement video, and a number corresponding to a last frame of the advertisement video.

12. The control method as claimed in claim 8, wherein in the determining of whether the second video is the advertisement video, the second video is determined as the advertisement video based on similarity between a sequence included in the second sequence and a sequence included in the reference data being greater than a predetermined value.

13. The control method as claimed in claim 8, further comprising overlaying and displaying data on the second video on a screen on which the second video is displayed while the second video is displayed based on the second video being determined as the advertisement video.

14. The control method as claimed in claim 13, wherein the data on the second video includes an end time of the second video.

* * * * *